United States Patent [19]

Fischer

[11] 4,218,117
[45] Aug. 19, 1980

[54] AUDIO SYSTEM VIBRATION ISOLATION ARRANGEMENT FOR PHOTOGRAPHIC VIEWER

[75] Inventor: Richard V. Fischer, West Warwick, R.I.

[73] Assignee: Polaroid Corporation, Cambridge, Mass.

[21] Appl. No.: 33,022

[22] Filed: Apr. 24, 1979

[51] Int. Cl.² ............................................. G03B 23/02
[52] U.S. Cl. .................................. 352/72; 352/27; 352/29; 352/130
[58] Field of Search ................. 352/27, 29, 72, 130

[56] References Cited

U.S. PATENT DOCUMENTS

| | | | |
|---|---|---|---|
| 3,604,790 | 9/1971 | Land et al. | 352/130 |
| 3,850,512 | 11/1974 | Scholz | 352/130 |
| 3,888,570 | 6/1975 | Stella | 352/130 |
| 3,893,756 | 7/1975 | Scholz | 352/130 |
| 3,902,797 | 9/1975 | Thomas | 352/29 |
| 3,905,690 | 9/1975 | Scholz | 352/72 |
| 3,909,120 | 9/1975 | Stella | 352/72 |
| 4,105,307 | 8/1978 | Holmes et al. | 352/72 |
| 4,135,793 | 1/1979 | Thomas | 352/72 |

*Primary Examiner*—Monroe H. Hayes
*Attorney, Agent, or Firm*—Frederick A. Goettel, Jr.

[57] ABSTRACT

A vibration isolating mounting arrangement for a sound accessory for a motion picture viewer is provided. The mounting arrangement includes an accessory mounting plate which precisely engages a portion of the viewer for locating the plate with respect to a film cassette receiving well in the top of the viewer. An audio component arrangement is provided which includes an audio transducer and means for advancing the audio tape past the transducer. These audio components are mounted to an audio component plate which is supported in overlying relationship with respect to the accessory mounting plate and the audio components carried thereby. The mounting between the two parallel plates is designed to effect vibration isolation between the plates, thus isolating the audio components carried by the upper plate from vibrations present in the viewer during its operational modes.

1 Claim, 7 Drawing Figures

AUDIO SYSTEM VIBRATION ISOLATION ARRANGEMENT FOR PHOTOGRAPHIC VIEWER

BACKGROUND OF THE INVENTION

This invention relates to an audio-visual system and, more particularly, to an improved magnetic tape drive and transducer system for use with a multipurpose film handling cassette.

Multipurpose motion picture cassettes from which the film need not be removed during exposure, processing and projection operations are described in prior U.S. Pat. Nos. 3,615,127 of Edwin H. Land, issued Oct. 26, 1971; 3,600,071, issued to Rogers B. Downey on Aug. 17, 1971; and 3,895,862, issued to Joseph A. Stella, et al., on July 22, 1975. In the systems of the above-identified patents, a cassette is operated in a camera for exposure of the film strip and then subsequently loaded into a projector apparatus which first subjects the cassette to a sequence of operations which process the film strip to a viewable condition and then subsequently projects the developed recorded images for viewing thereof.

A variety of arrangements have been proposed whereby audio operations may also be included in such a motion picture cassette system. Exemplary of such audio-visual systems is that described in prior U.S. Pat. No. 3,604,790 of Edwin H. Land, et al., issued Sept. 14, 1971, and U.S. Pat. No. 3,856,387 of William R. Wray, et al., issued Dec. 24, 1974, and copending U.S. patent application Ser. Nos. 869,131 and 899,782. The above-cited patents describe a film handling cassette in which the film is permanently retained during sound recording and playback as well as exposure, processing and projection operations. In the systems of the above-cited issued patents, a magnetic sound recording track is included along one or both of the longitudinal borders of the film strip. While these systems provide generally acceptable audio reproduction, the inherent restriction of the narrow width of the audio track, which cannot be allowed to interfere with the image bearing portion of the film strip lying therebetween, limits the level of sound quality which may be achieved or, conversely, substantially increases the sophistication and the cost of the sound apparatus necessary for high fidelity stereo. One suggested arrangement for alleviating the above-noted problem is to provide a transparent sound track over the full width of the photographic film strip; however, this solution creates its own difficulties in that the sound layer must not only be exceedingly thin in order to provide adequate transparency, but also complicates film production because of the necessity of imposing this layer on the image area of the photographic emulsion surface.

The above-cited U.S. patent application Ser. No. 869,131 proposes a somewhat different solution to the problem by providing a separate audio magnetic tape which is interwound on the common supply spool with the photographic film strip. The magnetic tape and the film strip are simultaneously removed from the spool and advanced synchronously along separate paths such that the photographic and audio operational functions may be performed upon the strips as they progress along their different paths.

In a preferred embodiment, the multipurpose film cassette is received in an open-ended well in the projector apparatus and an audio accessory is provided for overlying the cassette well following insertion of a cassette therein. The sound tape passes from the upper end of the cassette, and the open upper end of the well facilitates engagement of the tape by the audio components of the audio accessory which is positioned above the well.

The above-cited copending U.S. application Ser. No. 899,782 provides a tape drive and transducer arrangement for use with such an accessory wherein the magnetic transducer head is disposed within a rotating, vacuum capstan in fixed relation to the centrally located portion of the sound tape. The sound tape in turn is held against the capstan and the stationary head by air pressure resulting from a partial vacuum which is internal to the capstan and presented to the tape by peripheral openings which overlie the tape margins.

Viewing or projection apparatus such as that with which the audio accessories of the type described hereinabove are adapted to be used are provided with various electrical motors and drive systems for implementing the several operating cycles upon the film cassette and, as a result, considerable vibration is present during operation of the viewer as a result of the various drive motors, drive trains, cooling fans and other mechanical components contained therein. Such vibrations transmitted to the top-mounted audio accessories may result in undesirable effects upon the quality of the stereophonic sound information reproduced by the sound accessory and accordingly, such vibration is undesirable. A further requirement of such top-mounted sound accessories is that certain of the audio components contained therein be precisely positioned with respect to the audio tape of the audio-visual cassette to assure proper registration therebetween and proper synchronization between the audio and video information.

SUMMARY OF THE INVENTION

According to the present invention, an improved top-mounted sound accessory of the type described hereinabove is provided. The sound accessory is mounted on the top of the projector or viewer by a pair of flat, spaced apart parallel plates, the bottom plate being received and precisely registered with a recess provided in the top of the viewer and is provided with an opening therethrough to provide access to the upper end of the cassette receiving well of the viewer. The second plate is mounted through vibration isolating mounts in a position overlying the bottom plate and is further provided with an opening similar to the one in the bottom plate, again for permitting access to the upper end of the cassette receiving well. The audio system components, i.e. constant speed drive capstan and a magnetic record/playback transducer, are mounted in a housing which is pivotally mounted at one end to the second vibration isolated plate. As a result, during operation of the viewer and sound accessory, the only tie-ins between the viewer and the sound accessory are isolation loops formed in the magnetic tape on either side of the audio station, various flexible control cables extending from the top-mounted accessory to the viewer or to a separate stereophonic electronics module, and the vibration isolating mounts which extend between the two plates.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
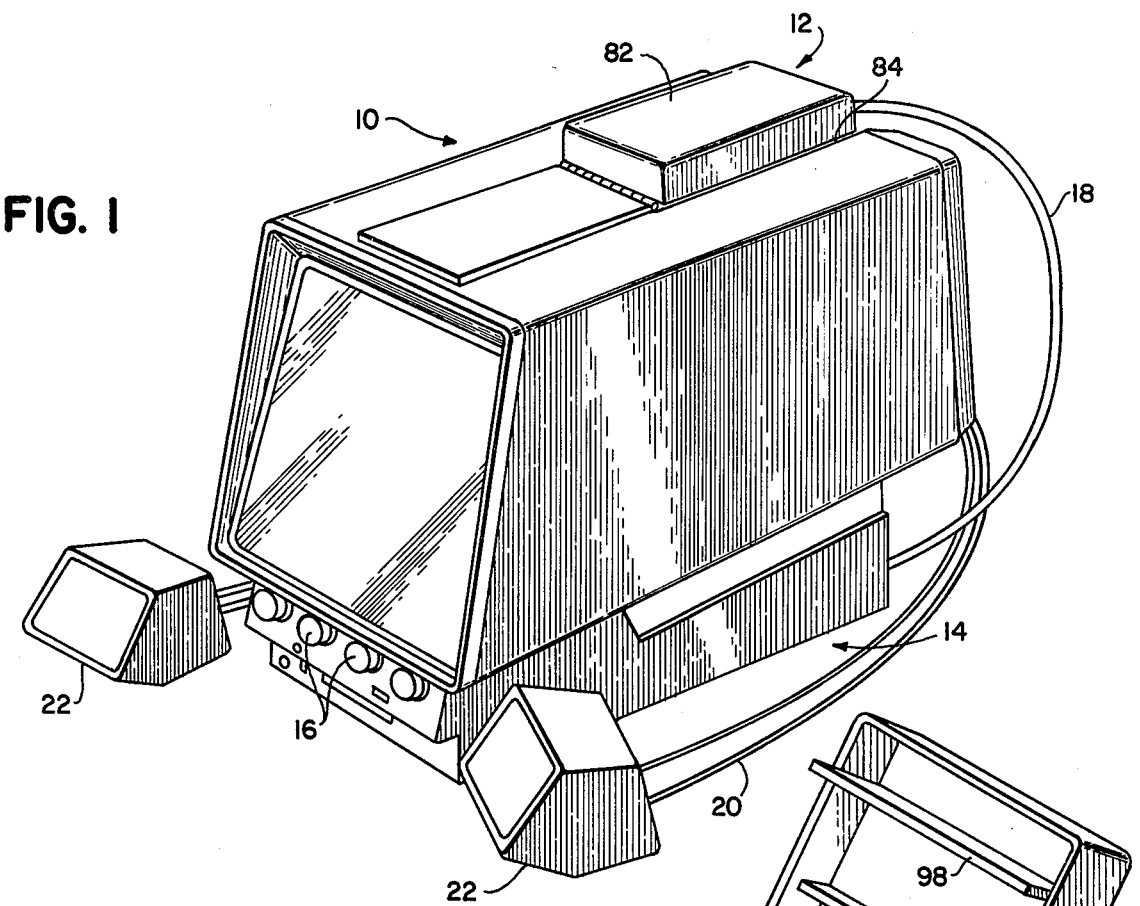
FIG. 1 is a perspective view of a silent motion picture viewer having mounted thereupon a sound accessory according to the present invention.

In FIG. 1 of the drawings, a rear projection viewer 10 is shown in operative engagement with a set of sound accessory modules which operate together with an audio-visual film cassette of the type shown and described in the above-noted U.S. patent application Ser. No. 869,131, wherein a film strip and magnetic tape are interwound on common supply and takeup spools. Basically, these modular sound accessories comprise a transducer and capstan drive module 12 which is adapted to be received in a recess in the top of the viewer to operatively engage the magnetic tape of the cassette as will be described in detail hereinbelow. An electronics module 14 is provided in the form of a base upon which the viewer 10 is shown mounted in FIG. 1. This base houses the appropriate stereophonic electronics and is provided with suitable controls 16 on the front side as is conventional in stereophonic sound reproduction equipment. A flexible "umbilical cord" 18 passes from the top-mounted transducer/drive assembly housing 12 to the lower electronics module 14 to thereby permit conveyance of the necessary electrical control and sound information therebetween. Suitable speaker wires 20 are provided leading to preferably remotely positioned right and left-hand speakers 22, 24 for providing the desired stereophonic sound of which the present system is capable of reproducing.

Figure 2:
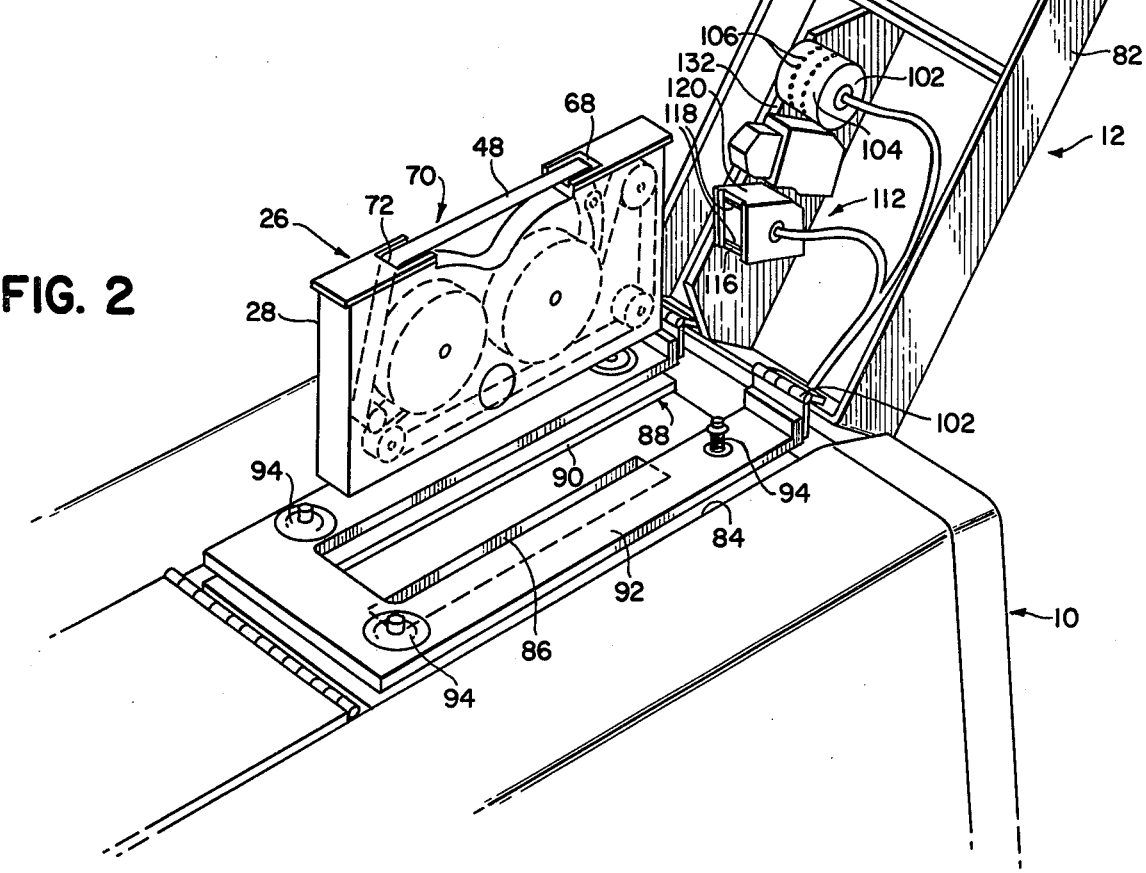
FIG. 2 is an enlarged perspective view of the top of a viewer such as that shown in FIG. 1 showing in a simplified manner the top-mounted sound accessory mounted according to the present invention.
Figure 3:
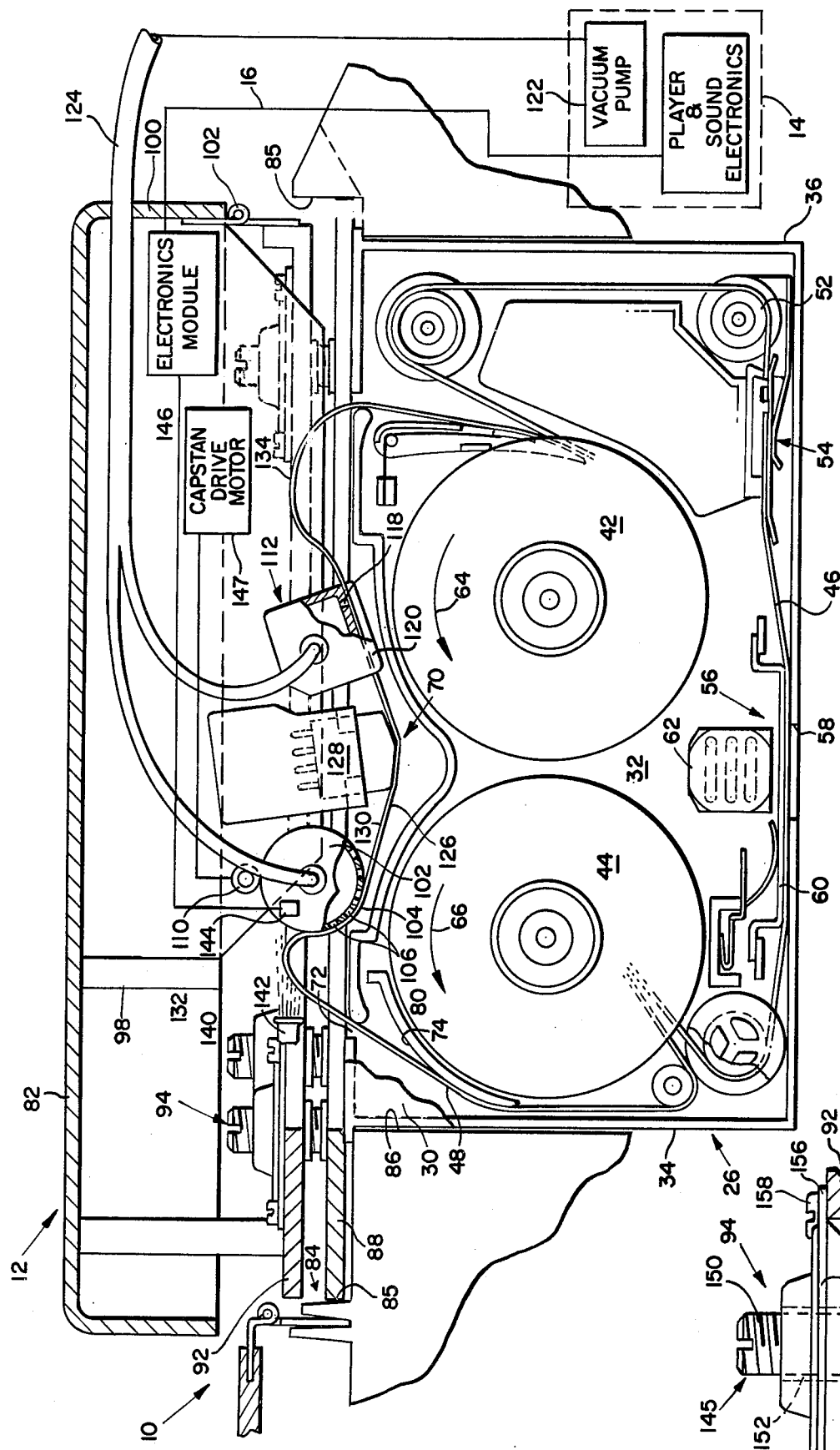
FIG. 3 is a cross-sectional view through the viewer of FIG. 1 showing the top-mounted sound accessory of the present invention in operative engagement with a multipurpose audio-visual cassette.

Referring now to FIGS. 2 and 3, a multipurpose audio-visual film/tape handling cassette 26 is illustrated for use with the apparatus of the present invention. The cassette comprises a generally parallelepiped casing or housing 28 constituted by a pair of planar side walls 30 and 32 joined together at their edges by end walls 34 and 36 and elongated top and bottom walls 38 and 40.

The illustrated cassette is a multipurpose cassette similar to that described in the aforementioned patents and copending application wherein the several operations of exposure, chemical processing, drying and projection of the recorded images is accomplished without removing the photographic film from the cassette. In this structure, processing of the film is automatically initiated responsive to film movement at a given time during the cassette operation. To accomplish this, the film spools and the film itself are operatively associated, again, as described in detail in the above-noted U.S. patents.

As best shown in FIG. 3, a supply spool or reel 42 and a takeup spool or reel 44, to which opposite ends of a photographic film strip or web 46 are affixed, are coplanarly mounted within housing 28 for rotation about parallel axes. A magnetic tape strip 48 is coupled to the film strip in a manner so that it may be interwound on the supply spool 42 along with the photographic strip 46 to be synchronously advanced therefrom in accordance with the rotation of the film spools. Much, if not all, of the tape which approximates that of the film 46, is available for sound recording, thereby permitting spaced multiple recording tracks for recording and playback of high fidelity audio information. Advantageously, both ends of the film strip 46 and the tape 48 are coupled together, facilitating synchronization of the image and sound information, as compared to non-connected strips.

As will be subsequently explained, both the photographic film strip 46 and the audio tape 48, while initially advanced together, are subsequently advanced along different paths. In this regard, the path of the film strip 46 which is substantially the same as that employed in the prior noted cassettes, will first be described. In its path from the supply reel 42, the film strip 46 first encounters a bobulator roller 50, engaging a portion of its periphery as shown, and passes therefrom to an idler roller 52 and then through a film processing station 54. Beyond the film processing station 54, the film 46 extends through an exposure/projection station 56, next passes around a snubber roller 58 and finally passes to the takeup reel 44. The exposure/projection station 56 includes an opening 58 at the bottom wall 40 of the cassette which functions to permit image forming light rays to impinge on the film strip when the cassette is operated in the camera and to subsequently permit light rays from an external source to be directed to the film strip outwardly of the cassette for the projection operations. To facilitate these functions, a pressure plate 60 and a prismatic reflector element 62 are mounted behind the opening 58.

Looking now at the audio tape 48, it will first be noted that the latter is initially fully wound on the supply spool 42 with the film strip and extends along a path to be further described hereinbelow to the takeup spool 44. FIG. 3 represents a cassette during the early stages of either the exposure/recording or projection/playback modes of operation. As such, substantially all of the motion picture film strip 46 and the tape 48 are wound upon the supply spool 42 and are being advanced along their respective paths to the takeup spool 44 with the reels rotating in the directions indicated by the arrows 64 and 66, respectively. The path of the audio tape 48 illustrated in FIG. 3 is in its desired audio operations path wherein the audio tape passes from the cassette housing 28 through a tape exit opening 68 and therefrom a slack portion 69 of the magnetic tape which has passed exteriorly of the cassette is drawn past the audio operations station generally represented at 70, which will be described in detail hereinbelow. Following passage through the audio station, the tape proceeds to a cassette entry opening 72 where it reenters the cassette and passes downwardly to the left of the takeup spool 44 around an arcuate guide surface 74 to a tape guide roller 76 which is positioned adjacent the snubber roller 52 and from there is guided by the roller 76 to the takeup spool 44. The audio tape exit and entry openings 68, 72 are defined by cutout portions of the cassette top wall 38 and are shaped to define suitable low friction tape guide surfaces 78 and 80, respectively thereat to facilitate smooth, unrestrained movement of the audio tape therethrough.

As mentioned above, mounted on the top of the player or viewer 10 is an audio module 12 comprising a magnetic transducer for recording and playback and a tape drive assembly mounted within a housing 82. The module 12 is positioned on the top of the player in precise registration with the audio-visual cassette 26 so that a portion of the audio tape 48 may be drawn into the audio system and audio information recorded thereon or extracted therefrom. Prior to explaining the audio system in detail, it should be noted that the system is intended to be either a permanent portion of a viewer system or an accessory thereof as explained in the aforementioned copending application Ser. No. 869,131, and includes audio reproduction or playback circuitry and components such as, for example, a microphone (not shown) or speakers which cooperate in a conventional manner with a transducer head of the system.

With reference again to FIGS. 2 and 3, it will be seen that the viewer 10 is provided with a rectangular recess 84 in its upper surface which surrounds an open-ended cassette receiving well 86 which is adapted to operatively receive a multipurpose audio-visual cassette therein for performing a variety of functions thereon. When received in the well 86, the cassette is latched into position and accordingly is precisely registered with respect to the viewer structure during the performance of such operations upon the cassette. It should be appreciated that the viewer is provided with a film handling drive system which is adapted to perform the various processing and projecting operations upon the cassette when in operative engagement therewith. Such operations are described in considerable detail in U.S. Pat. No. 3,941,465 to Erwin E. Figge, et al, entitled FILM HANDLING APPARATUS CONTROL SYSTEM, issued on Mar. 2, 1976, and assigned to the assignee of the present application. It should be further appreciated that the viewer apparatus is provided with various drive systems for implementing the several operating cycles upon the film cassette and, as a result, considerable vibration is present during operation of the viewer as a result of the various drive motors, drive trains, cooling fans and other mechanical components contained therein. In order to obtain the desired high quality stereophonic sound, the top-mounted audio recording and playback module 12 is mounted such that the audio components are precisely registered with respect to the film cassette and its magnetic tape while effecting vibration isolation between the sound accessory audio components and the considerable vibrations produced by the viewer when in its various operating modes.

Referring to the various drawing figures, the top-mounted accessory 12 is provided with an accessory mounting plate 88 which is adapted to be received within and cooperate with the several upstanding walls 85 defining the rectangular recess 84 in the top of the player for precisely positioning the plate 88 with respect to the viewer's cassette receiving well 86. The accessory mounting plate 88 is formed from a rigid metal plate and in the illustrated embodiment is substantially U-shaped, having an open-ended irregularly shaped opening 90 provided in the central portion thereof. When the plate 88 is in its operative position with respect to the player, the opening 90 overlies the open upper end of the cassette receiving well 86 to thereby permit cassette insertion and removal from the well.

A second structural plate 92 configured substantially identical to the above-described accessory mounting plate 88 is mounted in spaced overlying relationship to the accessory mounting plate 88 by means of four vibration isolating mounts, three of which 94 are the same and a fourth 95 which, for reason of available space is of a different type. This second plate, which will be referred to as the audio component mounting plate 92, assures that the vibrations present in the viewer during its various modes of operation will not be transmitted to the audio components which are mounted on the audio component plate 92 which will be described below following a detailed description of the vibration isolation arrangement.

Figure 4:
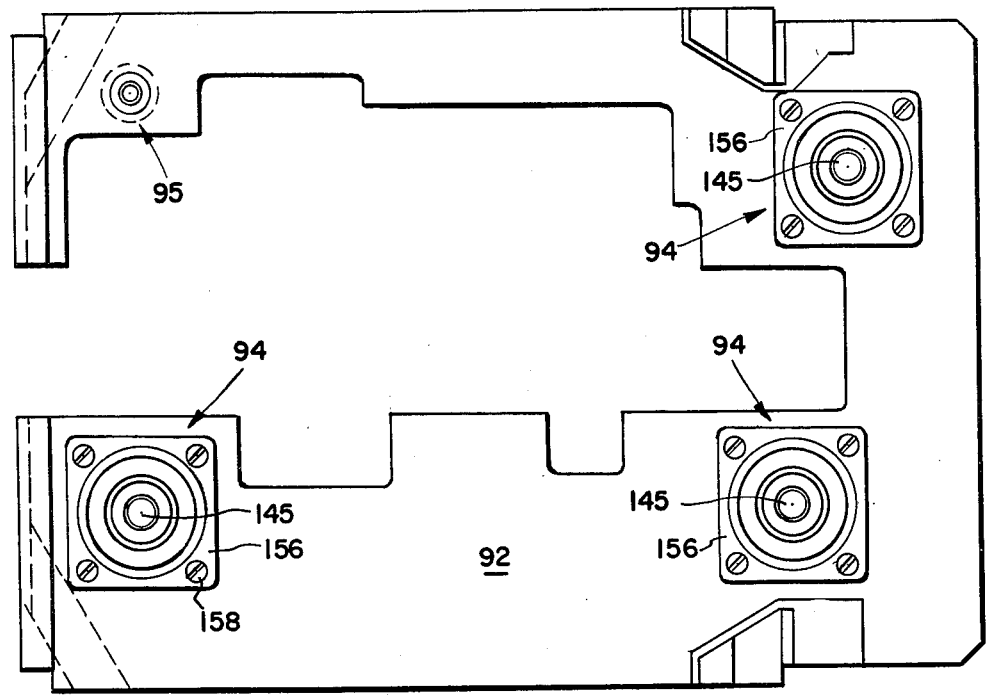
FIG. 4 is a plan view of the vibration isolating mounting arrangement according to the invention.
Figure 5:
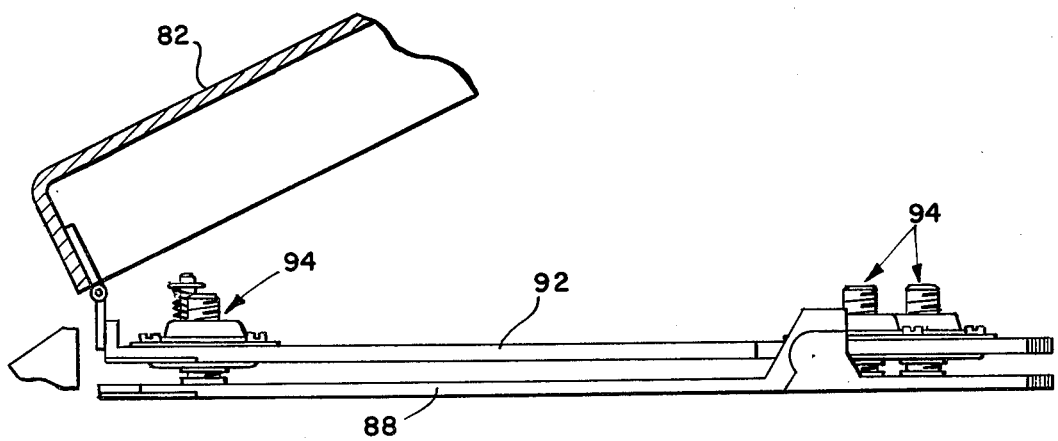
FIG. 5 is a side view of the mounting arrangement shown in FIG. 4.

With reference to FIG. 2, it will be noted that the mounting plates 88 and 92 shown in that figure represent a simplified showing of the plates as embodied in the actual apparatus wherein the U-shaped opening is shown as being substantially uniform. The actual configuration of the plates 88, 92 and the isolation arrangement is illustrated in detail in FIGS. 3-7. With reference to these figures, it should be noted that the showing of the plates in FIG. 3 is reversed right to left from the way they are depicted in FIGS. 4 and 5. With reference now to FIG. 4, the irregularly shaped opening 90 in the central portion of the upper plate 92 which is identical to that in the underlying accessory mounting plate 88, is shaped in such a manner to accommodate the audio components which are mounted in the module housing 82 as will be described hereinbelow and the shape of this opening is not critical to the invention except that it does dictate the use of a different shock mounting arrangement in the upper left-hand corner as shown in FIG. 4.

Figure 6:
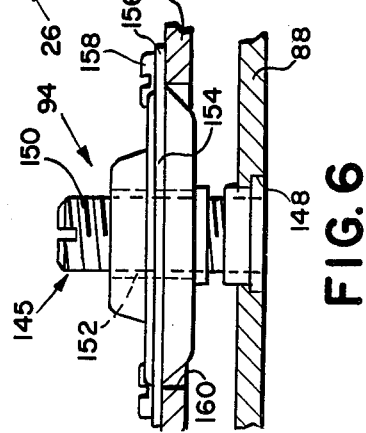
FIG. 6 is a sectional view of one of the vibration isolating arrangements used in the present mounting arrangement.

Referring now to FIG. 6, it will be seen that each of the three vibration isolating mounts 94 comprises an upstanding threaded post 145 which is fixedly mounted through an opening 148 in the lower accessory mounting plate 88. The threads 150 of these upstanding posts are adapted to be received in a mating threaded sleeve 152 carried in a flexible rubber vibration isolating mount portion 154. The flexible rubber portion 154 is in turn attached at its outer periphery to an opening provided in a metal mounting plate 156 which, in turn, is fixedly attached through suitable fastening means 158 to the upper audio component mounting plate 92. The flexible rubber vibration isolating portion 154 of the mount is received in an opening 160 in the upper plate 92 with only the structural portions of the mount's attaching plate 156 being in contact with the upper surface of the audio component mounting plate. As a result, a positive interconnection between the lower accessory mounting plate 88 and the audio component mounting plate 92 is formed through these three mounts 94 by the flexible rubber portion 154 of the mount.

Figure 7:
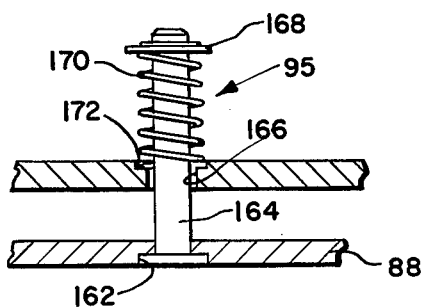
FIG. 7 is a cross-sectional view of another vibration mounting arrangement used with the invention.

With reference now to FIGS. 4 and 7, the fourth vibration isolating mount 95 as viewed in the upper left-hand corner of FIG. 4 is shown. Because of the limited space available in the plates 88 and 92, at this location this mount is configured differently from those described above; however, the principal of its construction and the end result are substantially the same. With reference then to FIG. 7, this mount 95 also comprises an upstanding pin 164 which is fixedly attached through an opening 162 in the lower plate 88 and which extends through an opening 166, larger in diameter than the pin, in the upper accessory mounting plate 92. The pin extends a substantial distance above the upper surface of the plate and terminates in a fixed collar 168 of larger diameter than the pin. Interconnection between the pin and the upper plate is accomplished by use of a resilient coil spring element 170 which is attached at its upper end to the underside of the collar 168 and is attached at its lower end to a circumferential groove 172 formed in the upper surface of the audio component mounting plate 92. As a result, positive interconnection between the plates 88 and 92 is formed by the resilient coil spring element. Accordingly, as a result of the above-described arrangement, the audio recording/playback and drive components which are mounted in a housing which is attached to the vibration isolated audio component mounting plate 92, are isolated from the vibrations present in the player 10 during its operation and thus, the effects of such vibrations on the audio components is minimized. It will be appreciated as the description of the audio recording/playback and drive components proceeds that all other interconnections between the audio components mounted upon the plate 92 and the viewer 10 are flexible connections which will also serve to isolate the upper module 12 from the vibrations of the viewer 10. Specifically, these interconnections include the above-described "umbilical" 18 which includes electrical connections between the module 12 and the viewer and/or electronics module 14 and may also include the flexible vacuum hose 124 which will be described hereinbelow.

The audio recording/playback and drive components are housed in a substantially rectangular enclosure or housing 96 enclosed on five sides and having a substantially open-ended bottom. The interior of the enclosure is provided with a plurality of structural ribs or partitions 98 which serve to mount the various components of the audio system.

With reference to both FIGS. 2 and 3, it will be seen that the audio component housing 96 is pivotally mounted at the lower end of its back wall 100 by a pair of hinged mountings 102 to the rearwardmost ends of the audio component mounting plate 92. Again, as briefly mentioned above and as will be described in detail hereinbelow, all of the audio components contained in the top-mounted audio module 12 are integrally mounted to the various structural ribs 98 within the housing 96 and, accordingly, when the enclosure is moved upwardly and rearwardly about its hinged connection 102 to the audio component mounting plate 92, all of the audio components will move out of operable engagement or relationship with the viewer and the cassette contained therein, as illustrated in FIG. 2.

When in its operable position, as shown in FIG. 3, the audio component module 12 is supported in the illustrated position by contact of a positioning and support rib 104 located within the interior of the housing near the forward end thereof; this positioning rib engages the audio component mounting plate 92 and, together with the hinged connections 102, positions the audio component housing 82 with respect to the mounting plate 88.

Accordingly, when in its operable condition as shown in FIG. 3 with a cassette in the viewer, the player 10, cassette 26, audio tape 48 and audio components are precisely positioned with respect to one another as follows. The cassette 26 and the magnetic tape 48 are accurately positioned by virtue of the retention of the cassette within the viewer well. The accessory mounting plate 88 is received within the rectangular recess 84 in the top of the viewer 10, thus positioning this plate 88 with respect to the cassette, and the audio component mounting plate 92 supported above the accessory mounting plate 88 by suitable vibration isolating mounts 94, and the audio module housing 82 and the audio components carried thereby are in turn supported by the plate 92 through the hinged connections 102, and the positioning rib 104 resting upon the upper surface of the vibration isolated plate 92.

The tape drive and transducer arrangement which will now be described in detail is configured to provide a highly efficient audio tape drive and transducer arrangement with only one side of the magnetic tape in contact therewith, while providing good transducer magnetic tape contact to provide a high quality stereophonic sound system. As best shown in FIG. 3, the tape drive arrangement includes a rotatably mounted capstan 104 arranged for driving engagement of a peripheral portion 106 thereof with a length of the magnetic tape 48. The capstan includes a plurality of openings 108 in its peripheral surface which are adapted to communicate the interior of the capstan with its outer driving peripheral surface (see FIG. 2). Such a capstan for driving a magnetic tape wherein a vacuum is utilized for the purpose of causing the tape to be gripped by the capstan is well-known in the prior art as is described in detail in U.S. Pat. No. 2,747,025 to W. T. Selsted entitled MAGNETIC TAPE APPARATUS AND TAPE DRIVING MEANS THEREFOR, issued on May 22, 1956, the disclosure of which patent is herein incorporated by reference. The rotatably mounted vacuum capstan 104 is engaged on its outer peripheral surface 106 by a constant speed motor drive shaft 110 for imparting driving rotation to the capstan when in operation as is conventional.

Turning back now to the arrangement of the audio components, a tape guide shoe 112 is positioned upstream from the drive capstan 104 with respect to the direction of motion of the tape during recording or playback as indicated by the arrow 114 in FIG. 3. The guide shoe defines a tape guiding surface 116 which includes one or more slotted openings 118 therein which communicate with an interior chamber of the guide shoe 112. The tape guide shoe 112 is further provided with a pair of spaced apart film side guides 120 adapted to engage the opposing lateral edges of the tape and to thereby guide the magnetic tape along its desired path. The spacing between the tape engaging surfaces of these side guides 120 is such that the tape is guided therebetween with little or no lateral shifting of the tape as it passes thereby.

As schematically shown in the drawings, a vacuum source or pump 122 is provided, preferably mounted in the lower electronics module 14. A flexible vacuum hose 124 interconnects the vacuum or low pressure source 122 with the interior of the constant speed drive capstan 104 and the interior chamber of the guide shoe 112. When actuated, the vacuum pump 122 serves to reduce the pressure within the capstan so as to attract the magnetic tape into engagement with the periphery of the capstan, and further serves to reduce the pressure within the interior chamber of the guide shoe so as to attract the tape into engagement with the tape guiding surface 116 and the tape side guides 120. The engagement of the tape with the surface 116 and the guides 120 serves to retard the movement of the tape in the tape's driven direction due to the frictional forces developed therebetween. The drive capstan 104 and the means for retarding, i.e., the tape guide shoe 112, accordingly cooperate to provide tension in the portion 126 of the magnetic tape which extends from the tape guide surface 116 to the capstan 104 when the capstan is rotatably driven by the constant speed drive shaft 110 and the vacuum pump 122 is actuated to reduce the pressure within both the capstan and the interior chamber of the guide shoe.

A suitable magnetic transducer 128, for facilitating recording or playback of audio information responsive to engagement with the sound tape during advancement of the tape therepast, is disposed in between the drive capstan 104 and the guide shoe 112 at a position such that the transducer will operably engage the audio information bearing surface 130 of the tape when the tensioned tape is drawn therepast.

Each of the three above-described audio components, i.e., the drive capstan 104, the tape guide or retarding shoe 112, and the magnetic transducer 128 are mounted upon the same structural support means or plate 132 which in turn is structurally supported by suitable interior ribs or partitions 98 of the accessory housing 96. The capstan and the drive shoe are fixedly mounted upon this plate while the magnetic transducer is attached thereto by suitable adjustable means for providing proper angular adjustment of the transducer 128 with respect to the audio tape.

With reference still to FIG. 3, it will be noted that a pair of free loops of magnetic tape 134, 136, respectively, are formed between the tape exit opening 68 and the tape guide shoe 112 and between the tape drive capstan 104 and the tape entry opening 72. Such free loops serve to isolate the constant speed motion to which the magnetic tape is subjected when being driven by the capstan from the intermittent motion to which the film strip is subjected during the projection operation by an intermittently advancing claw, for example as shown at 138, adjacent the projection opening 58.

In order to control the length of the free loops 134 and 136, a loop control arrangement generally designated at 140 is provided to sense the formation of the free loop 136 passing from the drive capstan 104 to the reentry opening 72 in the cassette housing. The loop control means comprises, as simply illustrated in FIG. 3, a light source 142 which may comprise an LED, and a photoelectric cell 144 which is connected to suitable motor control circuitry 146. The motor control is designed to control the pulsing or time span of current application to the drive motor 147 which drives the tape drive capstan. Accordingly, passage of light from the LED to the photoelectric cell is interfered with or reduced by formation of the tape loop 136 and this information is sensed by the motor control which alters the current fed to the motor, thus slowing the capstan and thus maintaining a substantially optimum size of the loops. As set forth above, it should be appreciated that the free loops formed adjacent both the tape exit and entry openings are critical in order to isolate the constant speed movement of the magnetic tape past the recording/playback head, which isolation is necessary in order to obtain the desirable high fidelity sound. In this regard, it should be appreciated that the loop control circuitry is designed to influence the speed of the capstan drive motor 110 at a level which is substantially unnoticeable in regard to acceptable wow/flutter and other sound quality standards.

In an exemplary vacuum drive system of the type with which the vibration isolation arrangement of the present invention may be used, the tension in the magnetic tape extending between the drag shoe and the drive capstan is maintained at such a level that the engagement of the portion of the magnetic tape adjacent the sound transducer is susbstantially the same as that provided by a conventional spring loaded felt backup pad arrangement which is disposed on the other side of the magnetic tape and urges the tape into engagement with the transducer. Such a felt pad arrangement typically would have a two and one-half gram spring force urging the tape into engagement with the transducer. It has been found in the present arrangement that a single vacuum pump for reducing the pressure in the interior of the drive capstan and the interior of the drag shoe may satisfactorily be employed with a vacuum on the order of 10 inches of mercury (Hg).

Accordingly, a vibration isolating mounting arrangement for a sound accessory for a motion picture viewer is provided. The mounting arrangement includes an accessory mounting plate which precisely engages a portion of the viewer for locating the plate with respect to a film cassette receiving well in the top of the viewer. An audio component arrangement is provided which includes an audio transducer and means for advancing the audio tape past the transducer. These audio components are mounted to an audio component plate which is supported in overlying relationship with respect to the accessory mounting plate and the audio components carried thereby. The mounting between the two parallel plates is designed to effect vibration isolation between the plates, thus isolating the audio components carried by the upper plate from vibrations present in the viewer during its operational modes.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A sound accessory for a motion picture player, the player comprising a cassette well configured for receiving a cassette which includes a flexible audio strip extended along a given path within the cassette to an audio opening thereof, said sound accessory comprising:
   an accessory mounting plate for engaging a locating portion of the player for locating said accessory mounting plate with respect to the cassette well, said accessory mounting plate having an opening therethrough overlying at least the audio opening of the cassette when the cassette is operatively received in the cassette well;
   audio means for providing an audio operation with the tape, said audio means including an audio transducer and means for engaging and for continuously advancing the audio tape across said transducer;

an audio component plate for mounting said audio means; and means for mounting said audio component mounting plate in overlying relationship to said accessory mounting plate with said audio means in operative relation to the audio opening of the cassette when the cassette is operatively received in the cassette well so that said engaging means will advance the tape across said transducer, said means for mounting comprising means for effecting vibration isolation between said accessory mounting plate and said audio component mounting plate.

* * * * *